US011129373B2

(12) United States Patent
Morris

(10) Patent No.: US 11,129,373 B2
(45) Date of Patent: Sep. 28, 2021

(54) SEGMENTED SHRIMP LURE

(71) Applicant: Marker 54, LLC, Austin, TX (US)

(72) Inventor: Joshua W. Morris, Austin, TX (US)

(73) Assignee: Marker 54, LLC, Austin, TX (US)

( * ) Notice: Subject to any disclaimer, the term of this patent is extended or adjusted under 35 U.S.C. 154(b) by 255 days.

(21) Appl. No.: 16/510,911

(22) Filed: Jul. 13, 2019

(65) Prior Publication Data

US 2020/0015466 A1 Jan. 16, 2020

Related U.S. Application Data

(60) Provisional application No. 62/697,720, filed on Jul. 13, 2018.

(51) Int. Cl.
*A01K 85/18* (2006.01)
(52) U.S. Cl.
CPC .................... *A01K 85/18* (2013.01)
(58) Field of Classification Search
CPC ....................................... A01K 85/18
USPC ............................................. 43/42.15
See application file for complete search history.

(56) References Cited

U.S. PATENT DOCUMENTS

| | | | | |
|---|---|---|---|---|
| 1,109,439 A * | 9/1914 | Maus | ..................... | A01K 85/18 43/42.15 |
| 2,597,792 A * | 5/1952 | Hardy | ..................... | A01K 85/18 43/42.15 |
| 2,663,964 A * | 12/1953 | Martin | ................... | A01K 85/18 43/42.02 |
| 2,910,799 A * | 11/1959 | Wentworth | ............ | A01K 85/16 43/42.02 |
| 3,349,513 A * | 10/1967 | Jeff | ........................ | A01K 85/00 43/42.02 |
| 3,438,144 A * | 4/1969 | Lincoln | .................. | A01K 85/18 43/42.15 |
| 3,543,430 A * | 12/1970 | Brokaw | ................. | A01K 85/00 43/42.05 |
| 6,212,818 B1 * | 4/2001 | Huddleston | ............ | A01K 85/00 43/42.09 |
| 6,546,663 B1 * | 4/2003 | Signitzer | ................ | A01K 85/00 43/4.5 |
| D742,475 S * | 11/2015 | Cook, Jr. | ...................... | D22/132 |

(Continued)

FOREIGN PATENT DOCUMENTS

| | | | | |
|---|---|---|---|---|
| CA | 2256832 | A1 * | 6/2000 | ............. A01K 85/18 |
| CA | 2923848 | A1 * | 5/2014 | ............. A01K 85/00 |
| EP | 1763996 | A1 * | 3/2007 | ............. A01K 85/18 |

*Primary Examiner* — Christopher P Ellis
(74) *Attorney, Agent, or Firm* — Kearney, McWilliams & Davis, PLLC; William Yarbrough, III

(57) ABSTRACT

The present invention evidences an artificial shrimp lure constructed of a solid head and thorax region that is coupled to a jointed and segmented abdomen region comprised of tethered segments which closely mimic the natural curvature and inward curling exhibited by a fleeing shrimp, where the eyelet of an internalized hook is precisely at the weighted midpoint of the lure, dorsally, the hook shaft is internalized and the hook point projects upward and rearward facing above the lures head. The artificial shrimp lure is capable, through eyelet placement and weighting, of maintaining a largely horizontal orientation upon casting and descent and displays an inward curving of the jointed and segmented abdomen region upon retrieval and ascent.

20 Claims, 5 Drawing Sheets

(56) References Cited

U.S. PATENT DOCUMENTS

| | | | | |
|---|---|---|---|---|
| 9,433,196 B1* | 9/2016 | Micelli | ............... | A01K 85/00 |
| 9,456,591 B2* | 10/2016 | Nichols | ............... | A01K 85/16 |
| 9,474,257 B1* | 10/2016 | McGilvry | ............ | A01K 85/02 |
| 2004/0148845 A1* | 8/2004 | Nakahashi | ............ | A01K 85/18 |
| | | | | 43/42.15 |
| 2006/0059767 A1* | 3/2006 | Tsai | ................... | A01K 85/16 |
| | | | | 43/42.15 |
| 2006/0260176 A1* | 11/2006 | Yeung | ................ | A01K 85/18 |
| | | | | 43/42.15 |
| 2007/0175083 A1* | 8/2007 | Wilson | ............... | A01K 85/02 |
| | | | | 43/42.15 |
| 2008/0078114 A1* | 4/2008 | Pack | .................. | A01K 85/18 |
| | | | | 43/42.15 |
| 2008/0115402 A1* | 5/2008 | Helmin | .............. | A01K 85/18 |
| | | | | 43/42 |
| 2012/0102815 A1* | 5/2012 | Hughes | .............. | A01K 85/18 |
| | | | | 43/42.02 |
| 2012/0272563 A1* | 11/2012 | Baker | ................ | A01K 85/18 |
| | | | | 43/42.22 |
| 2014/0250763 A1* | 9/2014 | Hrncir | ................ | A01K 85/01 |
| | | | | 43/42.06 |
| 2020/0015466 A1* | 1/2020 | Morris | ............... | A01K 85/18 |
| 2020/0352148 A1* | 11/2020 | Mancini | ............ | A01K 85/00 |
| 2021/0076650 A1* | 3/2021 | Bingham | .......... | A01K 85/18 |

* cited by examiner

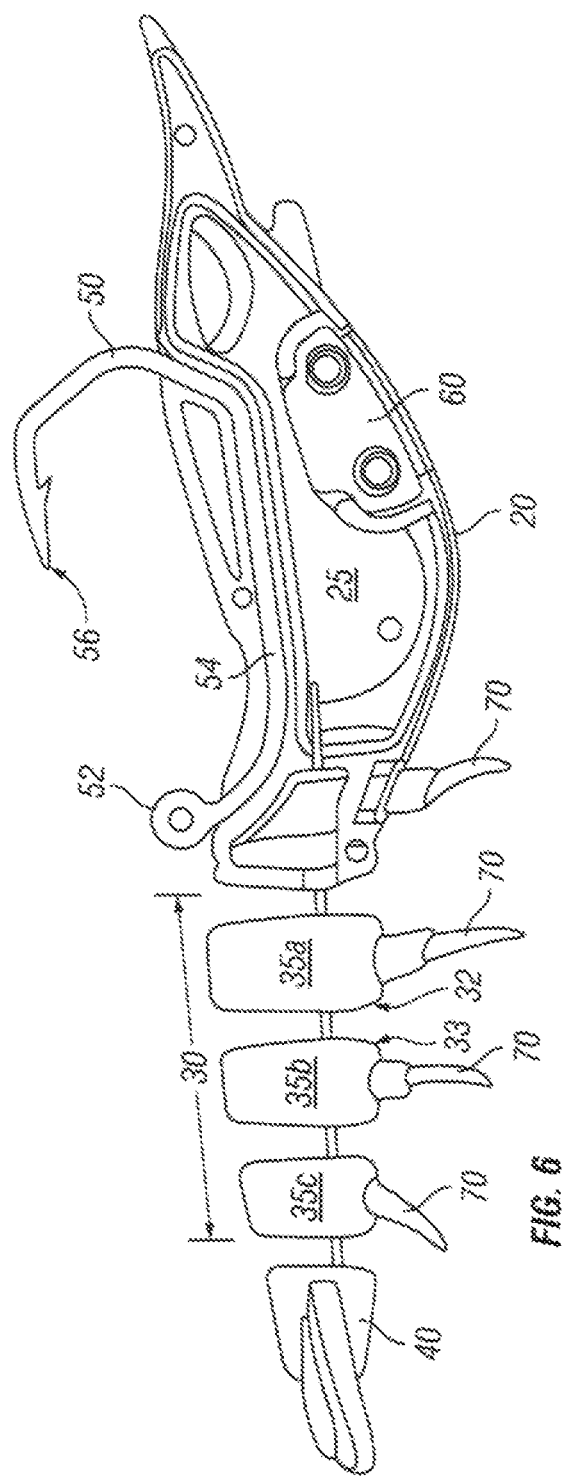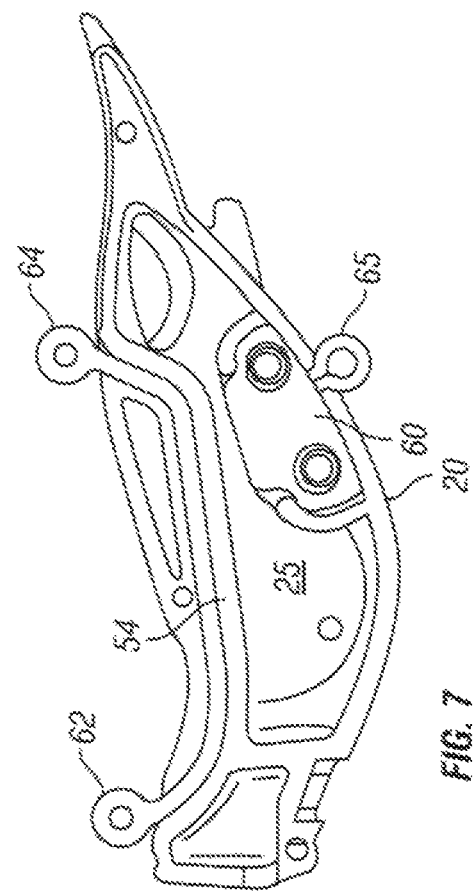

SEGMENTED SHRIMP LURE

REFERENCE TO RELATED PATENTS

The present application claims priority to the previously filed provisional application 62/697,720 filed Jul. 13, 2018.

FIELD OF THE INVENTION

The present invention relates to an artificial shrimp lure and method of use thereof of a combined "head" and "thorax" region joined and connected to a segmented, movable abdominal region for luring and catching fish, generally. Specifically, the artificial shrimp lure itself is comprised of a unitary "head" and "thorax" region (i.e. cephalothorax region) that is coupled to a jointed, segmented and axially tethered abdominal region which closely mimics the natural curvature and inward curling exhibited by a fleeing shrimp. The lure itself is balanced by the head and thorax region on one side and the abdominal region and tail on the other. The point of fishing line attachment, the hook eyelet, is presented dorsally, precisely midway between a weighted head and thorax region and segmented abdominal and tail regions via an up-tilting hook eyelet displayed by one end of a partially internalized hook shaft. The other end of the hook shaft is made to exhibit a hook bend terminating in a hook point, wherein the hook point is also externally displayed and rearwardly oriented, which is made to reside above the lure's head. Precise eyelet placement aids in maintaining a largely level and horizontal position of the artificial shrimp lure upon casting, suspension and descent, yet, with the application of a retrieving force, the shrimp displays a downward curling abdominal region (all while maintaining its largely horizontal cephalothorax orientation).

BACKGROUND

Shrimp, as with other decapod crustaceans, have body segments grouped into two main parts, the cephalothorax and the abdomen. The term "decapod" is attributed to the fact that shrimp, like crayfish, crabs and lobsters, have ten jointed appendages acting as "legs" which take the form of well-developed pleopods (swimmerets) and thin walking legs, used more for perching than actual walking, which makes shrimp a much more adept swimmer than walker. In addition to an adroit forward swimming motion, shrimp have an exceptionally muscular abdomen used to propel the shrimp backwards extremely quickly in what is known as a "caridoid escape reaction", "tail flip" or "lobstering", that works in conjunction with the telson and two flanking uropods (together making the tail), to allow for a hasty backward escape away from danger. It is these two primary modes of locomotion which a successful shrimp lure would seek to emulate.

Over the years, anglers, inventors and manufacturers have long anguished over the proper construction of artificial fishing lures, designed to mimic a live bait shrimp that would engender the attributes of (1) maintaining a principally horizontal configuration, (2) emulating a realistic shrimp-like rearward, "fleeing" action, (3) exhibiting a segmented tail capable of inward and downward curvature upon retrieval, and (4) preserving a largely horizontal position whether ascending or descending all while (5) lending itself to a durability of construction that allows for multiple and continuous use.

Clearly, several attempts have been made to address the need for an artificial shrimp lure that not only takes on the appearance of a live shrimp but also functions as a shrimp in its unperturbed state but, most especially, in a excited state of flight whereby a shrimp is operating to escape or flee a predator fish.

D692519 (2013) and U.S. Pat. No. 9,456,591 (2016), both granted to Nichols, exhibit a solid body lure "formed from an elongated body configuration to resemble a shrimp" (col. 2, lines 5-6). Yet, the Nichols "shrimp" only vaguely resembles a true shrimp as his lure is fixed and immovable, incapable of curvature of the abdomen and is reminiscent of any number of lures that are "drug" or "dragged", via front attachment, through the water toward the angler. As well, the Nichols hook point is frontwardly positioned, as opposed to a rearward facing hook point, ensuring that the predator fish must approach the lure from the rear to "consume" the lure (see also generally U.S. Pat. No. 3,229,407 issued to Quyle, U.S. Pat. No. 3,349,513 issued to Jeff and U.S. Pat. No. 3,528,189 issued to Lilley all utilizing a frontward attachment and front-facing hook points).

U.S. Pat. No. 2,597,792, issued to John James Hardy, slightly improves upon the uni-body construction of Nichols (supra) in that Hardy evidences a lure that is segmented—albeit into only two sections. Hardy, though, is equally incapable of a life-like tail curling, is nevertheless equally attached to a fishing line at the fore of the lure and exhibits hooks displaying front-facing hook points.

Both Martin and Brokaw, via U.S. Pat. Nos. 2,663,964 and 3,543,430, respectfully, seek to remedy the deficiencies of the above static or semi-static states of Nichols and Hardy through a "curving lure". But, both Martin and Brokaw rely upon the fishing line itself to actuate each lure's arc and each maintains the point of line attachment at the lure "head" to accomplish the pull (on both the "tail" section and the lure itself). Moreover, both the '964 and '430 patents evidence a hook point oriented in the direction of the line pull as is manifested in all of the previously enumerated lures above.

While strides have been made to overcome the inadequacies of mimicking a live shrimp, it remains evident that considerable failings remain in artificial lure design and functionality. It is in light of the above shortcomings that inventor seeks to remediate the deficiencies of the cited patents and address the long felt need for a shrimp that emulates both the appearance and action of a live bait shrimp at rest and "in flight".

While inventor has set forth the best mode or modes contemplated of carrying out the invention known to the inventor such to enable a person skilled in the art to practice the present invention, the preferred embodiments are, however, not intended to be limiting, but, on the contrary, are included in a non-limiting sense apt to alterations and modifications within the scope and spirit of the disclosure and appended claims.

SUMMARY OF THE INVENTION

The artificial lure that is the present invention provides for a precisely weighted head and thorax region, counter balancing abdominal and tail section and an precise point of line attachment that allows for a largely horizontal orientation of the artificial lure that is the present invention both upon descent and ascent in the water column upon casting and retrieving by an angler. The head and thorax, abdomen region and tail may be of a solid "hard" construction or a semi-soft or soft material construction that serves the purposes of harboring a (1) embedded hook shaft and dorsally deposed and rearwardly facing hook point display, (2) a midpoint line attachment to a weight balanced midpoint (between the unitary, internally weighted head and thorax region and the assemblage of abdominal region and tail) and dorsally located hook eyelet, (3) an optional ventrally located hook attachment eyelet, (4) a segmented, tethered and freely moveable abdominal region, (5) an anteriorly, forward disposed internalized weight in the head/thorax region in an area that would exist in the lower (front-facing) section of a shrimps carapace, and (6) discretionary hollow chambers for noise production.

The abdominal section is comprised of several joined segments with each segment designed in a stubbed/truncated cylindrical fashion wherein each segment is molded to incorporate a centrally disposed, axially running tether. The tether serves to both connect each segment to the next and to provide sufficient space, between two adjacent segments, to facilitate curvature of the abdominal region in both an upward planing and downward curving position. Upward pulling force, initiated with a lateral tug at the lure midpoint on the dorsally located eyelet, creates a downward curving of the segmented abdominal section which is stopped only when the lower posterior surface of the foremost section is made to come into contact with the lower anterior portion of the immediately adjacent and aft section, sequentially. Conversely, as the line is allowed to go lax, gravity takes effect and the lure descends, the tail segments move from a downward, inwardly-curled conformation to a largely straight and lateral display which is facilitated by a principally flat undersurface, on the most posterior and ventrally residing head and thorax region and each abdominal region segments. In this way a the combining of gravity and resistance against an upward buoyant force creates a flat, planar configuration. A simple pull on the fishing line and resultant application of upward force reverses the gravitationally influenced descent created by the overall weight of the lure and works to cause the abdomen to once again curve. Additionally, successive tugging on the fishing line, of equal or greater or lesser force, causes an equally sequential straightening and curving of the lure more closely imitating the natural action of a "fleeing" shrimp.

In short, the present invention evidences two distinct motions—a fully distended and flat "calm motion" and a backwards curled and "fleeing motion" with applied force-initiated abdominal flexure. As opposed to traditional, solid uni-body construction, capable of only forward ("dragged") motion, the midpoint line attachment and ultimate flexibility of the segmented tail uses the upward force of the line and downward resistance of the water on the upper dorsal surface to display an upward, fleeing motion with tail curled together with movement away from an approaching fish.

The present lure is unique in that it incorporates precise size and aerodynamics to create a tail movement that more closely emulates the natural tail curvature (via downward fluid force in the water column) of a fleeing live shrimp through the water. Exactly, by a point of line attachment that is dorsally midway (and precisely even weighted) positioned for receiving upward force (together with combined counter water flow about the lure's curved fuselage downward), the present invention that is the artificial shrimp lure is uniquely configured and weighted to result in an equilibrium between weight and buoyancy eliciting specifically desired and particular actions in the water. Specifically, the lure is ventrally counterweighted in the lower third of the head and thorax region to maintain a balanced weight with the tail and abdominal sections resulting in a largely horizontal orientation whether ascending or descending. Simply, the present invention combines an engineered relationship between the force from the line pull location, the angle and position of the weight placement in the lure and the fluid resistance on the head, thorax and segmented abdominal region of the lure to create a more life-like and visually seductive lure to a predator species and thus a more effective lure.

Physically, the horizontal and steady orientation of the shrimp lure is enabled through the concept of least resistance for an object moving among a set of alternative pathways. Used to describe why an object or entity takes a given path, the present invention "chooses" a backwards "fleeing" arrangement of parts due to the force of the line at a point equidistant from two equal weights (between the head and thorax and aft abdominal region) wherein the fishing line imparts the energy to the lure to encounter countervailing water resistance to manipulate the shrimp in a largely "C" configuration upon ascent as would be seen in a live shrimp attempting the escape predation. And, whereas the motion would be assumed to be backwards toward the pull of the angler (and rod tip), the motion is nonetheless vertical due to the point of line attachment and the resistance caused by the segmented tail's action in the water. Succinctly, the amount of water resistance supersedes the gravitational pull on the lure, the lure is therefore buoyant, and the path of least resistance becomes upward (as opposed to downward). Thus the shrimp lure that is the present invention rises in the water column to the surface exactly as a fleeing shrimp would accomplish. Even at full cast, the present invention will rise vertically and descend vertically, again just as a live shrimp would rise and descend. Furthermore, the upper surface of the head and thorax region and the upper surface of the abdominal region are curved to resemble the curvature of an airplane's fuselage aiding in the movement of water around the upper portion of the lure, upon ascent, in essence expediting the movement of water over the lures surface to push both ease the ascent of the head and thorax region and encourage abdominal region curvature upon application of upward force.

Leg Angle

The angle of the lure's front legs (i.e. those legs originating from the ventral and aft area of the head/thorax region) can vary between 90-110 degrees in relation to the bottom surface of the lure, or equally, from the side of the lure. The length of the legs is ideally set at 8 mm. The combination of length and angle provides the glide motion of the lure upon decent. Rear, or tail segment legs, do not seem to provide any utility difference to the lure function and are for novelty effect only.

Lure Weight

The internal weight is relational, and effects of gravity on the lure is dependent upon, the overall length of the lure wherein the ratio is critical for proper functioning. The ideal lead mass weight for a lure exhibiting a 4-inch length lure is $3/16$ oz. Combined with the hook mass and a lure plastic mass the total lure weight is slightly more than $1/4$ ounce. The lure suffers negative effects on buoyancy and orientation with a weight above $3/16$ oz. Conversely as the lure size scales down, so too must the lead mass weight to maintain proper lure orientation and action. At 3.5 inches the lead mass weight must be $1/8$ oz. at 3 inches length the lead mass weight must be $1/16$ oz and so on as size decreases. Preferably, the lure weight should be approximately 45 degrees to 60 degrees from the eyelet placed at the weighted midpoint.

Abdominal Segmenting

While inventor has explored several methods and modalities related to segment connection, namely top strap connection, bottom strap connection, and middle (centrally deposed, axially running) strap connection, only one means, middle (axially running) trap connection, is a viable configuration for proper lure functioning. Manifestly, placing the tail segment connectors on the top of the tail provides the least resistance and much less vertical rise performance while placing the abdominal segment connectors on the bottom of the tail segments provides the most resistance, however, this design tends to make the lure act erratically thus obviating the goal of creating a "lifelike" shrimp action. In opposite, connecting abdominal segments via a middle (centrally deposed, axially running) strap provides the ideal amount of resistance and flexibility for optimal lure performance in regard to horizontal positioning upon descent and suspension, vertical ascension upon application of force and subsequent upward line movement and abdominal curvature upon retrieval. It is for the above reasons that inventor has selected chosen a middle (centrally deposed, axially running) strap connection to the exclusion of both top strap connections and bottom strap connections. Also, preferably, each truncated section may exhibit a curved upper surface and largely flat bottom surface where the upper surface accelerates water over the abdominal region upon ascent and the flat bottom serves to oppose the upward buoyancy created by water in the water column upon gravity induced lure descent. In addition to a flat anterior and posterior flattening of the head and thorax region and natural planar tail configuration, largely flat surfaces on the underside of abdominal segments serves as a barrier to descent, straightening the abdominal region into an overall horizontal confirmation.

Of note, the abdominal sections of the present invention display truncated cylinder sections that decrease in diameter wherein the largest truncated cylinder is proximal to (and connected to) the head and thorax region while the smallest truncated cylinder is proximal to (and connected to the tail (terminus) region described below.

Terminus

Finally, the abdominal region terminates in a truncated cylinder "tail" that is largely conical in shape wherein the cone is horizontally oriented and where the base is largely flat anteriorly, curved and tapered posteriorly and of a diminishing girth and circumference from base, proximal to the abdominal region, to apex, distal to the abdominal region. Equally, the final truncated cylinder "tail" is made to exhibit winged projections resembling the telson and two flanking uropods of a live shrimp that may be parallel to the midline, upwardly or downwardly deposed. The tail is intrinsically planar and provides a flat surface, opposing buoyant water forces, and promoting a largely horizontal lure conformation (i.e. straightened abdominal region in line with a horizontally displayed head and thorax region).

BRIEF DESCRIPTION OF THE DRAWINGS

Advantages and other aspects of the invention will be readily appreciated by those having skill in the art and may be better understood with further reference to the accompanying drawings in which like reference characters designate like or similar elements throughout the several figures of the drawings and wherein:

FIG. 6 illustrates a vertically bisected head and thorax region coupled with an abdominal and tail region wherein a hook point, hook shaft and hook eyelet are displayed FIG. 7 is a head and thorax region bisected vertically to illustrate a dual dorsal fishing line eyelet and ventrically deposed hook eyelet configuration.

It should, however, be understood that the above figures and summary are not intended to limit the invention to the particular embodiment disclosed, but on the contrary, the invention disclosure is intended to cover all modifications, alternatives and equivalents falling within the spirit and scope of the invention as defined within the claim's broadest reasonable interpretation consistent with the specification.

DETAILED DESCRIPTION OF THE PREFERRED EMBODIMENTS

A detailed description of the preferred embodiments of the invention are disclosed and described below. Yet, each and every possible dimension and arrangement, within the limits of the specification, are not disclosed as various permutations are postulated to be in the purview and contemplation of those having skill in the art. It is therefore possible for those that have skill in the art to practice the disclosed invention while observing that certain features and spatial arrangements are relative and capable of being amended and adapted, arranged and rearranged at various points about the present invention that nonetheless accomplishes the remediation of one or more of the infirmities as outlined and discussed above in the field of artificial lure design and use. As well, the lure itself may be sized (i.e. enlarged or shrunken) so long as the proportions are maintained that allow for maintaining of esthetic appearance and proper functioning.

Equally, it should be observed that the present invention can be understood, in terms of both structure and function, from the accompanying disclosure as well as claims taken in context with the associated drawings. And whereas the present invention and method of use are capable of several different embodiments and permutations, which can be modified into several different configurations, each exhibiting accompanying interchangeable functionalities without departing from the scope and spirit of the present application as shown and described.

Figure 1:
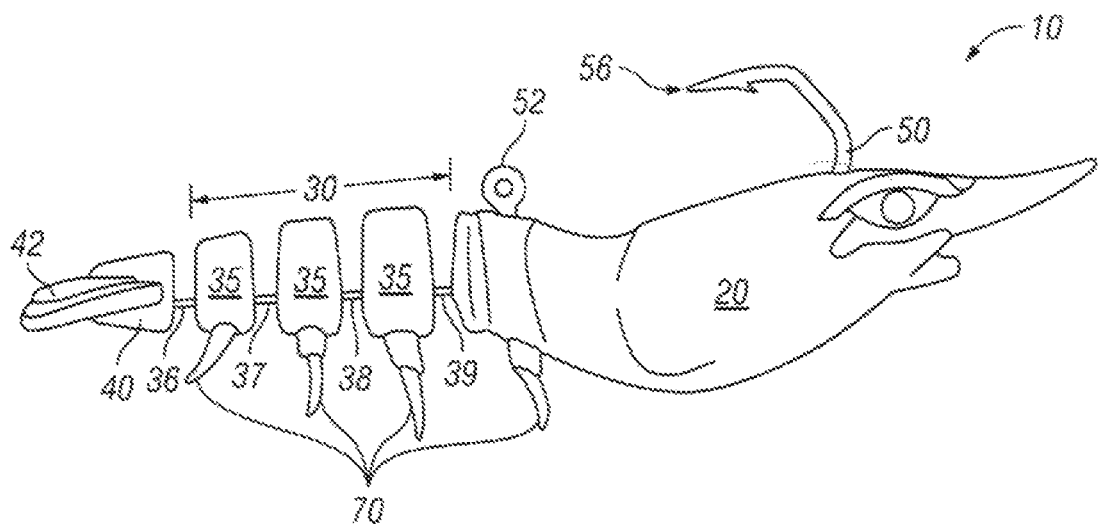
FIG. 1 depicts a side view of the present invention that is an artificial fishing lure.
Figure 4:
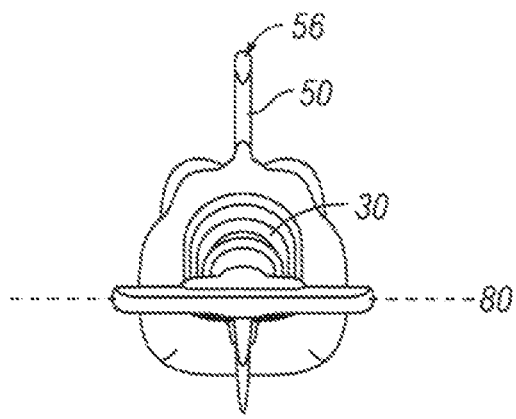
FIG. 4 shows an aft view of the present invention that is ab artificial fishing lure.
Figure 5:
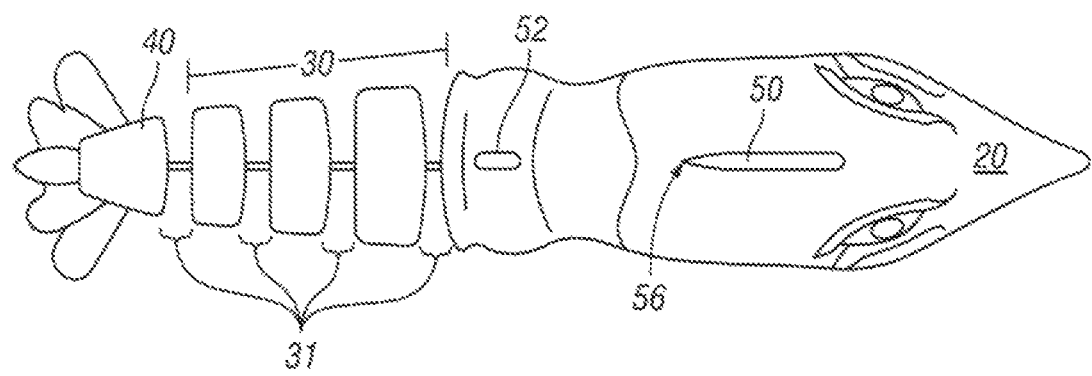
FIG. 5 depicts a top view of the present invention.

As depicted in FIG. 1, the artificial fishing lure 10 that is the present invention is depicted having 2 primary (and largely equally weighted) components: a unitary head and thorax region 20 and a jointed, segmented and axially tethered abdominal region 30 defined by individual abdominal segments 35. Manifestly, the unitary head and thorax region 20 can be seen to be connected to the abdominal region 30 via a pliable yet durable material (36, 37, 38,39) (i.e. polyester, nylon or a combination thereof as can be found most readily in certain "seatbelt webbing") centrally and axially disposed between (1) the unitary head and thorax region 20 and abdominal region 30 at point 39, (2) interposed between each abdominal section 35 at points 37,38 and finally (3) positioned between the terminal, conically shaped tail 40 at point 36. In greater detail in FIG. 2, abdominal segments 35 are represented sequentially as truncated or stubbed cylinders of decreasing diameter wherein 35*a* is larger than 35*b* and 35*b* is larger than 35*c*. Further, abdominal region 30 finally terminates with the conically tapered tail 40 which is made to display "winged" appendages 42 that are oriented parallel to the horizontal midline 80 (see specifically the horizontal midline in FIG. 4). Patently, each truncated section 35 exhibits a curved upper surface and largely flat bottom surface 67 where the upper surface accelerates water over the abdominal region 30 upon ascent and the flat bottom 67 serves to oppose the upward buoyancy created by water in the water column upon gravity induced lure descent. In addition to a flat anterior and posterior flattening of the head and thorax region 66 and natural planar tail configuration 68, largely flat surfaces 67 on the underside of abdominal segments serves as a barrier to upward water forces upon descent, straightening the abdominal region 30 into an overall horizontal confirmation in line with a largely horizontal head and thorax region 20 and flattening of the lure.

As depicted in FIGS. 1, 2, 5 and 6, the abdominal region 30 provides sufficient space 31, between each adjacent segment 35 (as well as space between head and thorax region 20 to abdominal region 30 and abdominal region 30 to tail 40), to facilitate curvature of the tail section in downward curving position (due to upward application of force created by a fishing line attachment at eyelet 52) and aid in a planar configuration with diminution of upwardly applied force. Specifically, upward pulling force, initiated with a lateral tug at the lure midpoint on the dorsally located eyelet 52, creates a downward curving of the segmented abdominal region 30 which is stopped only when the lower posterior surface 32 of the foremost segment 35a is made to come into contact with the lower anterior portion 33 of the immediately adjacent and aft section 35b, which is repeated sequentially at 35b and 35c.

Figure 2:
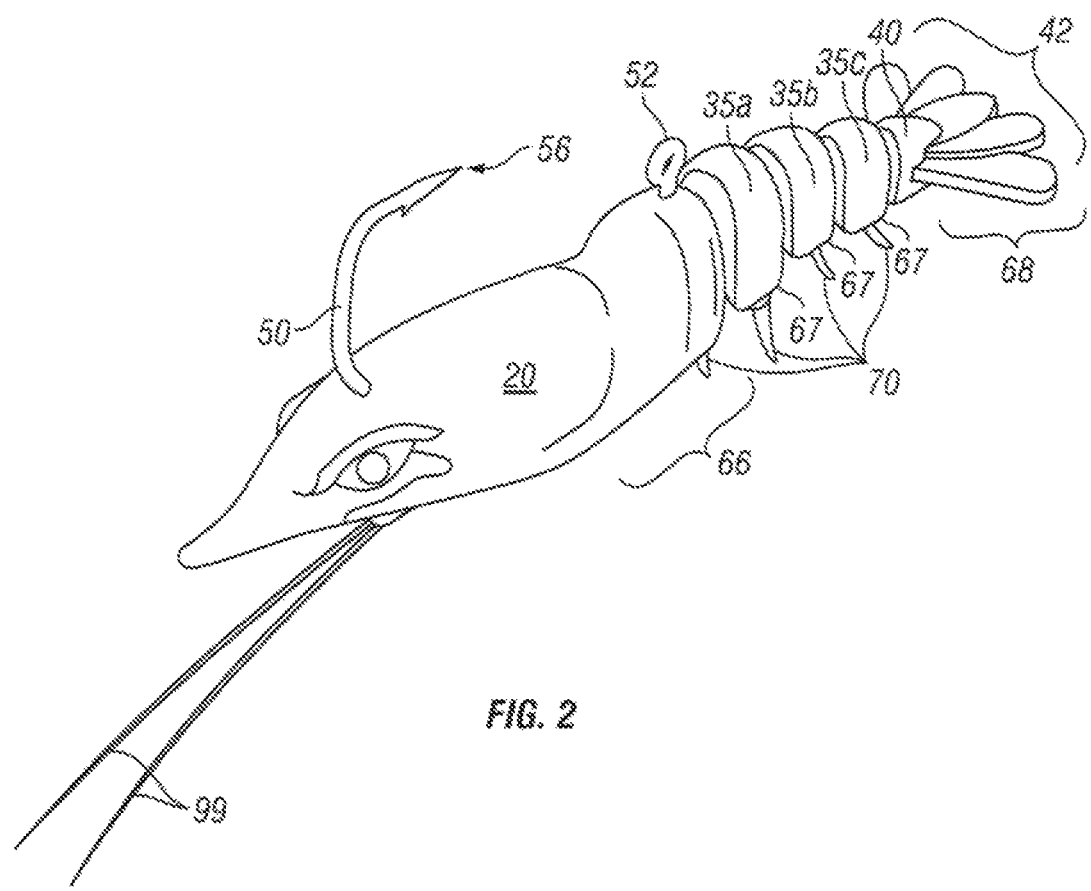
FIG. 2 shows a perspective view of the artificial fishing lure of FIG. 1.
Figure 3:
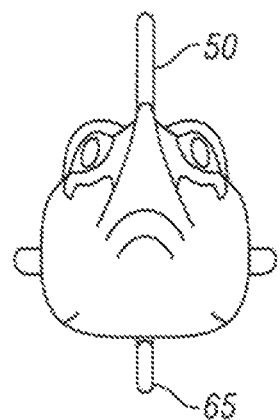
FIG. 3 illustrates a front view of the invention of FIG. 1.

Of particular importance, each truncated abdominal segment 35 may exhibit a largely flat surface 67 which serves to oppose the upward buoyancy created by water in the water column upon lure descent causing a gradual lowering of the lure in the water column. In addition to a flat anterior and posterior flattening of the head and thorax region 66 and implicit planar tail confirmation 68, largely flat surfaces on the underside of abdominal segments 35a-35c serve as a barrier to descent, straightening the abdominal region into an overall horizontal confirmation with gravity induced fall. In addition, legs 70 adhered to the head and thorax region 20, and to a lesser extent legs 70 adhered to truncated abdominal segments 35, while functioning less to cause tail straightening, aid in a more efficient and uniform descent in the form of a "glide". Curved upper portions of the head and thorax region 20 and curved upper portions of abdominal segments 35 (as best represented in FIG. 2) expedite and facilitate ascent upon upward force application, in the case of the head and thorax region 20, and induce abdominal curvature, applying downward pressure on each abdominal tail segment 35.

FIGS. 6 and 7 illustrate, as well, another crucial feature, in addition to eyelet 52 placement, tethering 36-39 of segments 35, and proper segment and tail spacing and placement, in the form of lure head and thorax region 20 weighting. Weight 60, as displayed in FIGS. 6 and 7, is consciously placed to provide the necessary equal distribution of weight between head and thorax region 20 and abdominal region 30 (in addition to tail section 40) wherein the head and thorax region 20 is counterbalanced (with the inclusion of weight 60) against the combination of the abdominal region 30 in conjunction with tail section 40. Too, head and thorax region 20 exhibits a hollow cavity 25 that may serve to harbor any number and/or shape of "rattles" that serve to propagate sound as an additional predator attractant.

As opposed to the functionality of attraction, as defined in the eyelet placement and tail curvature above, the functionality of operation in actually catching a fish can be viewed in FIGS. 1-6 where the head and thorax region 20 can been seen to partially internalize a hook 50 displaying the external portions of the hook 50, namely the hook eyelet 52 and hook point 56, where each resides at opposite ends of the hook 50, the hook eyelet precisely at a weighted midpoint between the head and thorax region 20 and the abdominal region 30 (further including, as well, the tail 40) and the hook point 56 externally displayed and rearwardly oriented above the artificial fishing lure's 10 head. Explicitly, the hook point 56 is purposefully rearward facing as to facilitate a much more effective and efficient predator attachment from a "fleeing" lure where the angle is causing artificial fishing lure 10 to retreat backwards.

Additionally, as is represented in FIG. 7, the lure that is the present invention may, instead of displaying a hook point 56 and an eyelet 52, shown in FIGS. 1-6, present a first eyelet 62 and a second eyelet 64 at either end of hook shank 54 whereby the present invention 10 may have a point of attachment at the weighted midpoint of lure 10, on the dorsal and posterior portion of the head and thorax region 20, a first eyelet 62, with an additional point of attachment above the head section, a second eyelet 64, allowing for lateral (weighted midpoint) or forward motion functions, with alternative attachment choices first eyelet 62 and second eyelet 64, respectively. In the case of these dual eyelets, a ventral hook placement 65 is warranted as to replace the removed hook point 56 of FIG. 6.

Figure 8:
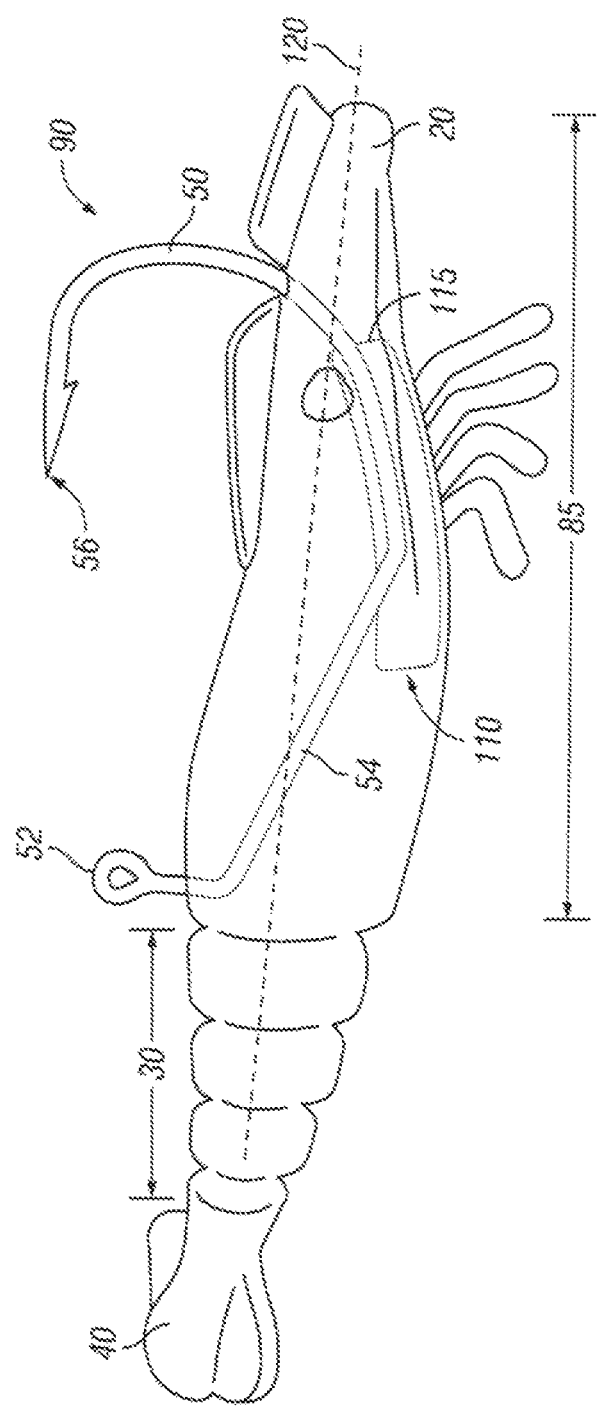
FIG. 8 shows a uni-body, soft-body lure with inserted fishing hook.

FIG. 8 displays a uni-body, soft-body artificial fishing lure 90 wherein the ventral side 85 of head and thorax region 20 is largely flat in order to enable lure 90 to maintain a largely horizontal orientation upon descent. In opposite to the artificial fishing lure 10, the composition of artificial fishing lure 90 is uniform across its length wherein the same, or similar, material is used for head and thorax region 20, abdominal region 30 and tail 40. And, where the hook 50 placement in artificial fishing lure 10 is permanent, the hook 50 of artificial fishing lure 90 is placeable and replaceable at the decision and predilection of the angler. Although changeable and interchangeable, the placement of hook point 56, hook shaft 54 and hook eyelet 52 retains the rearward-facing hook point 56 and weighted midpoint eyelet 52 orientation for all of the above stated reasons. Moreover, it is not outside the scope of the invention to take on the dual eyelet manifestation with a ventrally adhered hook 65. Furthermore, as can be seen in FIG. 8, the hook may be combined as a hook and weight integration 110 wherein the weight portion 115 remains below the center line 120 and the majority of lead mass is below the hook mass offsetting the hook mass to cause the lure to descend in a more natural descent.

As evidenced in in FIGS. 1 and 2, artificial lure 10 of FIG. 1 may be esthetically modified to display filamentous "antennal flagellum" or "antennule" 99 anteriorly, projecting in front of and away from the "head" of the head and thorax region (as shown in FIG. 2) to give the appearance of a true live shrimp.

Figure 9:
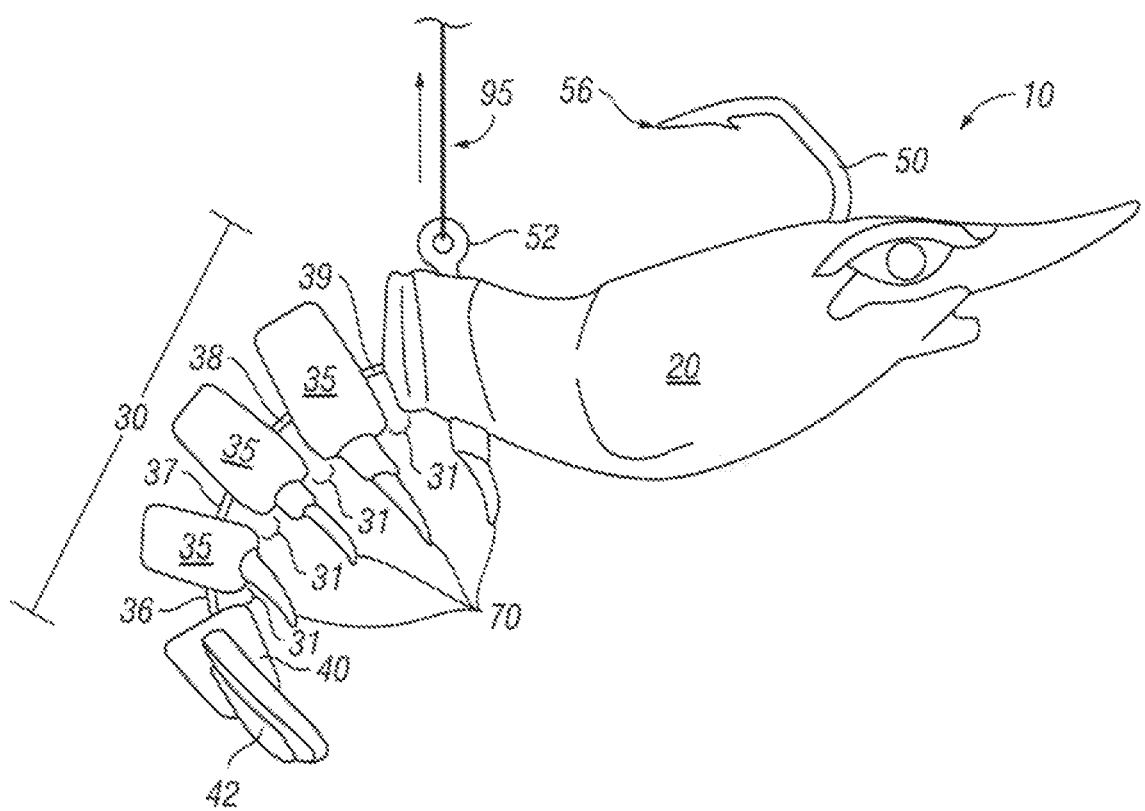
FIG. 9 depicts the artificial lure of FIGS. 1-6 in a curved configuration.

Finally, FIG. 9 embodies the artificial fishing lure 10 in a 'C' shaped configuration where fishing line pull 95 upward on weighted midpoint eyelet 52 causes an arching of abdominal segments 35 via downwardly inward abdominal region 30 curvature at tethered connection points 39, 38, 37 and 36 whereby legs 70 move into ever closer proximity, space 31 between segments 35 is shorted and the terminus (tail 40 and "winged" appendages 42) achieves a position most inferior to the head and thorax region 20. As the line 95 applies force upward, water, choosing the path of least resistance, is expedited about the curved upper portions of the head and thorax region 20 and curved upper portions of the abdominal section 30. In this manner, the head and thorax region 20 rapidly ascends and the abdominal 30 region curves downward and inward. In opposite, flattened sections 66, 67 and 68, as illustrated in FIG. 2, serve to create resistance to upper buoyant forces, upon weighted and gravitationally induced descent thereby allowing the head and thorax region 20 to remain horizontal and the abdominal region 30 to assume a planar orientation in line with the head and thorax region 20.

It is important to note that the particular embodiments disclosed above are for illustrative purposes only, as the presented invention may be modified and practiced in different, but equivalent manners which would be apparent to those skilled in the art as instructed by the teaching herein. It is therefore evident and possible that the particular embodiments disclosed above are alterable and modifiable, but that all such iterations are encompassed by the above disclosure and the protections sought are covered herewith. Although the present application discloses a finite number of forms and examples, the present invention is not limited to just these forms and examples but is amendable to various changes and modifications without departing from the spirit thereof.

Preferred Embodiments

A detailed description of the preferred embodiments of the invention is disclosed and described below. Yet, each and every possible feature, within the limits of the specification, are not disclosed as various permutations are postulated to be in the purview and contemplation of those having skill in the art.

In one preferred embodiment, the artificial shrimp lure that is the present invention may be of a 'hard' body, semi-solid or 'soft' body composition wherein defining features are nonetheless consistent between 'hard' body and 'soft' body versions.

In another embodiment, the artificial shrimp lure that is the present invention may have a point of attachment at the midpoint between the head and thorax region and the abdominal section, first eyelet, with an additional point of attachment on the head section, second eyelet, allowing for dual lateral and forward motion functions, with alternative attachment choices, respectively.

In yet another embodiment, the present lure may have only one point of attachment, at the midpoint between the head/thorax region and the segmented abdominal region, that allows for a largely horizontal orientation upon descent and ascent, and a rearward facing hook point and frontward facing hook barb positioned dorsally above the head/thorax region.

In another embodiment, a hook may be embedded into the head and thorax region and made to run parallel to the mid-line of the head and thorax region where the hook eyelet (residing at the midpoint of the lure) also functions as the inwardly curving hook eyelet, the shaft of the hook runs axially through the sold body of the lure, bends rearwardly and exits just behind the "head region" evidencing a rearward facing hook point with a downward, forward facing barb. Equally, it is within the contemplation of inventor that the hook barb may be upward facing or the hook itself may exhibit one to a plurality of barbs disposed about the collar of the hook point.

In yet another embodiment, the head and thorax region may maintain hollow cavities for both or either a counterbalance weight (located most advantageously ventrally and proximal to the lure "head") and a more centrally deposed area for "rattle" spheres or beads. In its best mode contemplated, the artificial shrimp lure is ventrally counterweighted in the lower third of the solid head/thorax region to maintain a balanced counterweight to the tail/abdominal section resulting in the conservation of a largely horizontal orientation whether the lure is ascending or descending. Yet, the weights and rattles could be positioned differently, either internally or externally, so long as the proper balance is achieved and maintained.

In another embodiment, plastic or like filamentous appendages may be placed on the bottom facing sections of both the head/thorax region and on the individual "tail" segments, ventrally to more closely resemble shrimp swimmerets and/or walking legs and to aid in gliding and fluid movement upon descent.

In another embodiment, the last section of the segmented tail may display a "fin" or "wings" representing a telson and two flanking uropods that is largely parallel to the horizontal midline. It is as well within the purview of the inventor to orient these appendages upwardly or downwardly planing.

In another embodiment, the present lure may have a point for exterior hook attachment which is ventrally deposed opposite of the shrimp carapace peak. This point of attachment may reside in a ventrally deposed area opposite the weighted midpoint line attachment eyelet in any posterior area that does not have deleterious effects on weight equilibrium.

In yet another embodiment, the segmented tail may be cast with a tether that is pliable, strong and durable and able to withstand repeated wettings and rewettings (i. e. "seatbelt" nylon or polyester webbing).

In another embodiment, the segmented tail segments of a hard bodied lure may be made of truncated cylinder shapes that decrease in diameter from attachment at the head and thorax region to the tail region whereby the largest circumference is proximal to the lure midpoint and the smallest circumference is distal to the lure midpoint. The tail segments, in combination with the posterior portion of the head and thorax region, may evidence a largely flat surface, ventrally, as to more efficiently oppose the upward force created by buoyant water pressure evidenced upon lure descent in the water column as to cause straightening of the abdominal region into a largely planar configuration.

In yet another embodiment, the entire under surface of the head and thorax region of a soft-lure may exhibit a largely flat surface, from approximately nose to terminus of the head and thorax region (i.e. area just before the abdominal region), as to oppose the buoyant forces of water in the water column and to allow for a largely horizontal configuration upon descent.

In another embodiment, the hard-type lure may be made of a synthetic ABS (Acrylonitrile butadiene styrene) plastic, a bio-plastic, organic materials, naturally derived or other similar "hard" materials and soft-type lures may be made of TPE (Thermoplastic elastomers) or other like material including polyvinyl chloride (PVC) and polyvinyl alcohol (PVOH) but may also include other soft plastics such as biologically or organic (natural) based soft plastics. Of course, lures may be constructed of a combination of the above or may exhibit both hard and soft areas or regions.

In yet another embodiment, a hook may manufactured into the head and thorax region of said artificial lure, as is the case in a hard-type lure or soft-type lure, or may be inserted, removed and reinserted, with the same or new hook, as the angler desires, in the case of a soft-type lure.

In another embodiment, the artificial fishing lure that is the present invention may exhibit "antennal flagellum" or "antennule" anteriorly, projecting in front of and away from the "head" of the head and thorax region to more realistically portray a live shrimp.

I claim:

1. An artificial fishing lure comprising:
   a unitary head and thorax region;
   a segmented, freely movable abdominal region;
   said unitary head and thorax region connected to said abdominal region;
   said segmented, freely moveable abdominal region displaying abdominal segments connected each one to the next linearly;
   said segments resembling truncated cylinders with decreasing diameter moving away from the connection point between said unitary head and thorax region and said abdominal region;
   said head and thorax region and abdominal segments having a curved fuselage, dorsally and a flat surface ventrally for facilitation of abdominal region curvature upon ascent and planar, horizontal configuration upon descent;
   said abdominal region capped by a conical shaped tail section terminating in a tapered terminus that is made to display wings in the shape of a fanned tail parallel to the horizontal midline of the lure;
   an internalized weight encapsulated anteriorly and ventrally in said unitary head and thorax region to counterweigh and balance said unitary head and thorax region against said abdominal region;
   a partially internalized hook exhibiting an externally residing hook point, an internalized hook shank and an externally displayed hook eyelet;
   said hook eyelet residing at the point of connection of said head and thorax region and said segmented abdominal region;
   said hook point and hook eyelet exhibited at opposite ends of said hook shank;
   said partially internalized hook exhibiting a rearward facing hook point dorsally above said head; and
   said partially internalized hook exhibiting an eyelet precisely at the weighted midpoint of said lure.

2. The artificial fishing lure of claim 1 wherein the terminal, posterior and ventral section of the head and thorax region and ventral portions of each abdominal segment may be made to display downward projecting and or side projecting legs with angles varying between 90 to 110 degrees in relation to the bottom of the lure or projecting from the side of the lure which aid in uniformity of descent.

3. The artificial fishing lure of claim 1 wherein the materials used for manufacture are of a solid synthetic, biologically or organically derived plastic material resulting in a hard-type bait.

4. The artificial fishing lure of claim 1 wherein the materials used for manufacture are of a semi-solid synthetic or naturally derived plastic material resulting in semi-solid type bait.

5. The artificial lure of claim 3 or 4 wherein the segmented, freely movable abdominal region may be tethered axially and centrally to permit abdominal region movement up to and including both straightening and curling upon descent and ascent, respectively.

6. The artificial fishing lure of claim 1 wherein the materials used for manufacture are of soft synthetic plastic, biologically or organically-based plastic materials.

7. The artificial fishing lure of a solid or semisolid construction as described in claim 3 or 4 wherein
   abdominal segments may be tethered axially and centrally with a pliable connecting material for connection of said unitary head and thorax region connection to said abdominal region and connection of said abdominal segments to one another to permit tail movement.

8. The artificial fishing lure of claim 6 wherein said lure is a soft-body, uni-body design wherein said abdominal segments are attached to the head and thorax region, proximally, sequentially to one another in the abdominal region and to the tail section distally.

9. The artificial fishing lure of claim 8 wherein said soft-body abdominal segments are adhered to each next abdominal segment, linearly, and wherein said unitary head and thorax region, said abdominal region, said conical shaped tail section, including said means of attachments of said abdominal segments, are all made of the same soft plastic material.

10. The artificial fishing lure of claim 9 wherein a hook may manufactured into the head and thorax region of said artificial lure or may be inserted, removed and reinserted, with the same or a new hook, as the angler desires.

11. The artificial fishing lure of claim 1 wherein said partially internalized hook may display hook eyelets at either end.

12. The artificial fishing lure of claim 11 wherein a hook is adhered at a point of hook attachment residing ventrally, at the downwardly faced apex residing at any point along said head and thorax region not negatively effecting the weight distribution between the head and thorax and abdominal region of the lure.

13. The artificial fishing lure of claim 1 wherein internal chambers may be encompassed within the head and thorax region for weight insertion, for proper balance between head and thorax and abdominal section, and/or noise making insertions.

14. The artificial fishing lure of claim 13 wherein said internal weight is 3/16 ounce for 4-inch lure and the combined weight of said lure, including body mass, weight and hook, is approximately 1/4 ounce, internal weight is 1/8 ounce for 3.5-inch lure and 1/16 ounce for a 3 inch lure.

15. The artificial fishing lure of claim 3 wherein the posterior portion of the head thorax region and the bottom surface of said truncated cylinders of the abdominal region may display a largely flat surface for more efficiently opposing the upper force of water in a water column thus maintaining a largely horizontal configuration of the artificial lure upon descent and the dorsal portion of both head and thorax region and abdominal region displaying a curved upper surface where said upper surface accelerating water over the abdominal region upon ascent, opposing gravitational forces causing the abdominal region to curl.

16. The artificial fishing lure of claim 6 wherein the posterior portion of the head and thorax region, from nose to the most terminal point of said head and thorax region just before the abdominal region, may display a largely flat surface designed to more efficiently oppose the upper force of water in a water column thus maintaining a largely horizontal configuration of the artificial lure upon descent, the head and thorax region are curved to facilitate ascent and the hook is integrated into the hook a point below a lure centerline to provide for essential weight placement.

17. A method of use of the artificial fishing lure of claim 1 wherein life-like action is achieved through the steps comprising:

attaching said artificial fishing lure at the lure hook eyelet, dorsally, precisely between the equally weighted head and thorax and abdominal region midpoint;

casting said fishing line with attached artificial fishing lure, via a rod and reel, into the water;

allowing said artificial fishing lure to descend in the water column vertically via gravitational pull while maintaining a largely horizontal orientation do to a largely flat under surface;

placing an upward pulling force at the midpoint, created at the connection of the weighted head and thorax and abdominal region, through fishing line retrieval causing a lateral head and thorax region ascent, opposing gravity and facilitated by a dorsal curvature on both the head and thorax and abdominal regions; and causing abdominal region curvature downward through said line retrieval force and downward resistive water force application across the curved upper surface greater than the upward buoyant forces on the bottom of said abdominal region.

18. The method of claim 17 wherein lessening or release of force of line retrieval causes decreased water force application across the upper surface of said abdominal region and increase buoyant water force on the largely flat bottom surface of said abdominal region resulting in the straightening of said abdominal region to a largely horizontal orientation of the entire lure.

19. The method of claim 17 wherein successive applications of retrieval force interposed with disapplication of force causing a "tugging" on the fishing line, of equal or greater or lesser force, causes an equally sequential straightening and curving of the lure's abdominal region that more closely imitates the natural action of the tail curvature of a "fleeing" shrimp.

20. A method of use of the artificial fishing lure wherein a partially internalized hook displays said two hook eyelets of claim 11 dorsally at either end of the partially internalized hook shank wherein fishing line is threaded onto one of the two eyelets thereby allowing an angler to select either a lateral or forward motion of the artificial fishing lure comprising the steps of:

positioning a first eyelet at the weighted midpoint between the head and thorax region and the abdominal region and a second eyelet dorsally above the head portion of the head and thorax region;

placing a hook via a hook attachment at a point ventrally along the downward facing apex of the head and thorax region;

inserting fishing line through said first eyelet inducing lateral movement in the water column; and alternately, inserting fishing line through said second eyelet for forward motion.

* * * * *